March 20, 1934.    L. R. EWING ET AL    1,951,509
THRESHING MACHINE
Filed Dec. 21, 1931
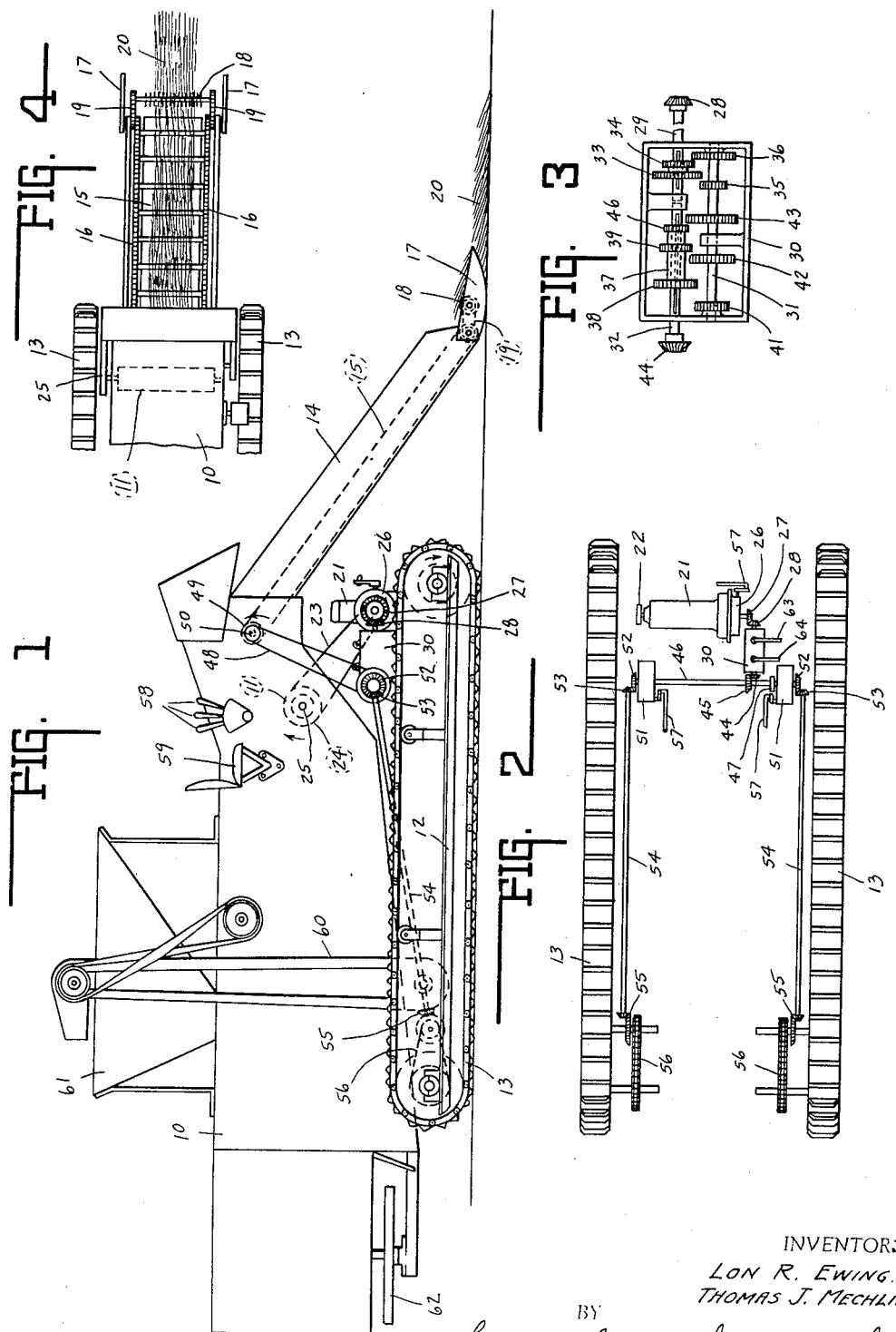
INVENTORS.
LON R. EWING.
THOMAS J. MECHLING.
BY Lockwood Lockwood Goldsmith & Galt
ATTORNEYS.

UNITED STATES PATENT OFFICE 1,951,509

THRESHING MACHINE

Lon R. Ewing, Kokomo, and Thomas J. Mechling, Burlington, Ind.

Application December 21, 1931, Serial No. 582,256

3 Claims. (Cl. 56—20)

This invention relates to a threshing machine, and particularly to that type of threshing machine which is provided with an attachment adapted to pick up a windrow of cut grain from the ground and deliver the same to the threshing cylinder of the machine as the machine is moved forward along the windrow. This type of threshing machine is commonly known as the "windrow thresher", and is used after the grain has been cut and deposited in windrows without being bound into sheaves. In this type of apparatus, it is common practice to drive the threshing cylinder and other threshing elements of the machine from the same power source that is used to propel the machine. Under these conditions, the speed of rotation of the threshing cylinder has heretofore been proportional to the speed of movement of the machine. If the machine travels at a relatively high speed, the threshing cylinder also rotates at a high speed, while, if the machine is slowed down, the threshing cylinder is also slowed. However, the most efficient operation of a threshing cylinder is secured at a certain definite speed and it has, therefore, been necessary, in order to maintain this efficient speed, to move the machine forward at a uniform speed. The yield of grain, however, varies from one part of a field to another so that one part of a windrow may have a much larger amount of grain than other parts. The capacity of a threshing cylinder is limited to a certain definite quantity of grain per unit of time. If this quantity is exceeded, the cylinder is clogged and fails to function. For best efficiency, the grain should be fed to the cylinder at a rate close to its maximum capacity without at any time exceeding its capacity. However, with a windrow thresher moving at a uniform speed over a field having a varying yield of grain, the speed must be such that the threshing cylinder will not be overloaded in passing through the heaviest yield of grain. In the lighter yielding portions of the field, the threshing cylinder is not operating at full capacity. This is especially true where the grain is laid in double windrows by a harvesting machine, such as that described in our prior Patent No. 1,816,519, granted July 25, 1931, since the variations in the yield of grain in the double windrow are twice as great as in a single windrow.

The principal object of the present invention is to provide a windrow thresher in which the threshing cylinder is continually operated at a uniform speed at or near its most efficient speed while the speed of movement of the machine through a field is independently regulated to supply grain to the threshing cylinder at a uniform rate irrespective of the variations in yield. In this manner, the threshing cylinder is always operated efficiently and is supplied with sufficient grain to keep it operating at or near its maximum capacity. In the preferred form of the invention herein described, this is accomplished with a single motor for propelling the machine and for operating the threshing cylinder and other threshing elements.

Another object of the invention is to arrange the conveyor, which lifts the grain from the ground and delivers the same to the threshing cylinder, in such manner that the grain is delivered with the least amount of damage and loss and with the least amount of danger of clogging the conveyor when large weeds are present in the windrow. This is accomplished by placing the conveyor upon the front of the machine so that the grain is taken directly from the ground to the threshing cylinder without being forced to make abrupt changes in its direction of movement and by adjusting the speed of the conveyor so that the windrow is picked up bodily and transported to the cylinder without disarranging the window formation. Where grain is picked up at the side of an advancing threshing machine, its direction of movement is first changed to move it sideward into the machine and its direction is again changed at the end of the sideward movement to bring it to the threshing cylinder. Under these conditions, the presence of weed stalks larger than the grain stalks tends to clog the conveyor at each change of direction, since these long weeds can not be forced to make the turn by means of the usual type of conveyor mechanism. This results in a stoppage of the grain flow to the cylinder so that the cylinder operates for a time with nothing in it but the previously separated grain kernels. This operation damages these kernels by cracking or splitting them. When the weed has been removed, the accumulated grain reaches the cylinder in a mass and often momentarily overloads the cylinder with a consequent loss of grain which is not separated from the straw.

In the present invention, the grain moves from the windrow to the thresher with no abrupt change in direction. The speed of the elevating conveyor is preferably adjusted to be substantially the same as the speed of forward movement of the machine so that the windrow moves directly up the conveyor in its windrow form. There is little or no tendency to pull the individual stalks from their positions in the windrow and the formation of the windrow is not substantially disarranged until the grain is discharged from the end of the conveyor into the cylinder. Under these conditions, there are practically no grain kernels knocked from their stalks as the grain is picked up and the pressure of weeds in the windrow does not clog the conveyor. The grain is delivered to the cylinder at a uniform rate.

Other objects and features of the invention will be understood from the accompanying drawing and the following description and claims:

Figure 1 is an elevational side view of a windrow threshing machine constructed according to the invention. Figure 2 is a diagrammatic plan view showing the arrangement of the motor and other mechanism used for propelling the machine. Figure 3 is an elevational view partly diagrammatic showing the preferred form of a speed control mechanism for use with the propelling mechanism and grain conveyor. Figure 4 is a fragmentary plan view of the front end of the machine.

The threshing machine is herein shown as comprising a housing 10 carrying a threshing cylinder 11 and other common threshing mechanism not indicated in the drawing. The housing 10 is mounted upon a frame 12 in turn supported upon caterpillar treads 13 in any convenient manner. At the front of the machine there is pivotally mounted a conveyor frame 14 supporting a conveyor 15, preferably of the endless belt type, supported upon sprocket chains 16. At the foot of the conveyor frame 14 there are provided ground shoes 17 which support the forward end thereof upon the ground. Between the ground shoes 17 there is provided a rotatable brush 18 which is driven by sprocket chains 19. The said brush travels along the ground and is adapted to elevate the grain 20 from the windrow onto the conveyor 15. Since the grain is placed in the windrow with the heads of each stalk lying upon the grain previously deposited, the brush 18, when once placed beneath the windrow, continues to pick up substantially all of the grain as the machine is advanced along the windrow. The grain from the conveyor 15 is discharged directly into the threshing cylinder 11 within the machine. The only changes of direction which the grain is obliged to make are the changes in the vertical plane when it is picked up by the conveyor and when it is discharged therefrom.

A gasoline engine 21 or other suitable form of motive power plant is mounted upon suitable framework, not shown, immediately beneath the forward end of the housing 10. The said engine carries at one end of its crank shaft a pulley 22 about which is trained a belt 23 also trained about a pulley 24 which is attached to the shaft 25 of the threshing cylinder. The other moving elements of the threshing mechanism proper which are not shown in the drawing are driven in the usual manner from the shaft 25. The motor 21 is normally operated at constant speed either by manual control or a suitable governor and this speed is so chosen that the threshing cylinder 11 operates at or near its best efficient speed.

The opposite end of the motor 21 has attached thereto a clutch diagrammatically indicated at 26 and which is connected to a bevel gear 27 so that the motor rotates said bevel gear when the clutch is engaged. The gear 27 meshes with a second bevel gear 28 carried upon the drive shaft 29 of a gear shift mechanism carried within a gear box 30. The said gear box also carries a second shaft 31 and a drive shaft 32. The drive shaft 29 has mounted thereon gears 33 and 34 adapted to mesh with gears 35 and 36 respectively which are keyed to the second shaft 31. The gears 33 and 34 are formed integrally with each other and may be moved upon the shaft 29 by the usual form of gear shift mechanism to mesh either one or the other with its mating gear. The driven shaft 32 carries a splined sleeve 37 upon which there are mounted gears 38, 39 and 40 which are adapted to mesh with gears 41, 42 and 43 respectively, the latter gears being mounted upon the second shaft 31. The sleeve 37 and the gears carried thereby may be moved along the shaft 32 to bring either of said gears into mesh with its mating gear. As will be seen from Figure 3, the gears are of such size as to give varying speed ratio between shafts 39 and 32, and a large number of different speed ratios may be selected by suitable meshing of the gears.

The shaft 32 carries a bevel gear 44 meshing with a bevel gear 45 carried upon a transverse shaft 46. The shaft 46 carries a pulley 47 keyed thereto about which there is trained a belt 48 also trained about a pulley 49 carried upon the upper shaft 50 of the conveyor 15. By this means the power of the motor 21 is utilized to run the conveyor 15 at various speeds, depending upon the selection of the change speed gears in mesh. The shaft 46 carries at each end a clutch 51, each connected to a bevel gear 52 which gears are rotated by the shaft 46 when the clutches 51 are engaged. Each of the gears 52 has meshed therewith a bevel gear 53 carried upon a drive shaft 54 extending rearwardly. Each of the drive shafts 54 drives one of the caterpillar treads 13 through bevel gears 55 and sprocket chains 56. The clutches 51 are used in maneuvering the machine, the left hand clutch being disengaged when it is desired to turn to the left and the right hand clutch when it is desired to turn to the right. By this mechanism the power of the motor 21 is utilized to move the caterpillar treads 13 and to propel the machine at varying speeds, depending upon the selection of gears in the gear box 30. Since the speed of the conveyor 15 and the speed of the machine are both determined by the gears in box 30, the conveyor speed is always proportional to the speed of advance of the machine. Preferably, the conveyor speed is so adjusted as to be substantially equal to the speed of advance. In this manner, the windrow is transferred bodily to the conveyor without any tendency to destroy the windrow formation. The clutch 26 and the clutches 51 are operated by suitable levers and linkages indicated generally by the numeral 57 and which are connected by any suitable means to levers 58 mounted upon the side of the housing 10 immediately in front of an operator's seat 59 similarly mounted. The change gears 33 and 34 are operated by a shifting rod 63 and change gears 38, 39 and 40 by a shifting rod 64, both of said rods being connected to suitable levers controlled from the operator's seat.

The threshing machine is shown as fitted with the usual grain elevator 60, grain bin 61 at the top and straw spreader 62 at the rear. However, these features form no part of the invention and other suitable means of disposing of the grain and the straw may be provided. Other variations in the details of the structure herein described may be made without departing from

The invention claimed is:

1. In a threshing machine, the combination of means for propelling the threshing machine, a conveyor mounted on the forward end of the machine adapted to pick up a windrow of cut grain from the ground as the machine moves, and driving mechanism for said conveyor driving the same at substantially the same speed as the forward movement of the machine so that the windrow formation is not substantially disturbed as the grain moves onto the conveyor.

2. In a threshing machine, the combination of a threshing cylinder, means for operating said cylinder at a substantially constant speed, means for propelling said machine, a conveyor adapted to pick up cut grain from the ground as the machine is advanced and to carry the same to said threshing cylinder, and mechanism for driving said conveyor, said mechanism being connected to said propelling means to move said conveyor at a speed substantially equal to the speed of movement of said machine.

3. In a threshing machine, the combination of a threshing cylinder, propelling elements for moving said machine, a conveyor adapted to pick up cut grain from the ground as the machine is advanced and to carry the same to said threshing cylinder, a motor, a driving connection between said motor and said cylinder for driving said cylinder at a speed proportional to the speed of said motor, a driving connection between said motor and said propelling elements and said conveyor for driving said conveyor and propelling said machine at substantially the same speed, and means included in said driving connection for varying said speed.

LON R. EWING.
THOMAS J. MECHLING.